Dec. 31, 1968 E. L. SMITH 3,418,975
FARROWING PIG PEN
Filed Aug. 8, 1966 Sheet 1 of 2
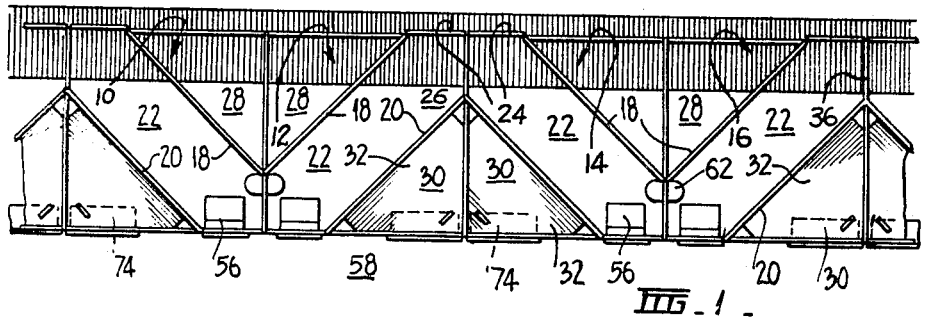
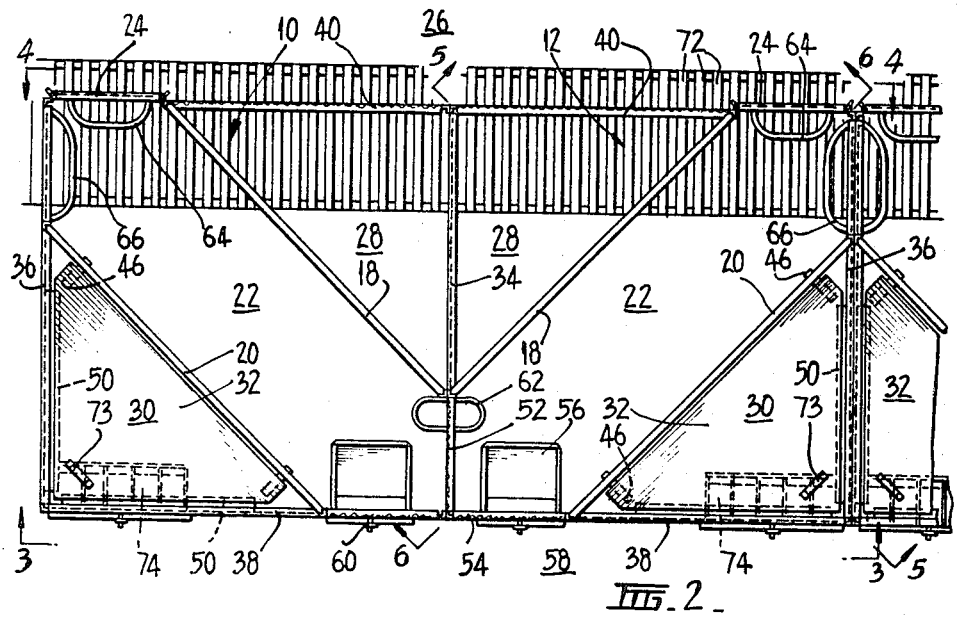
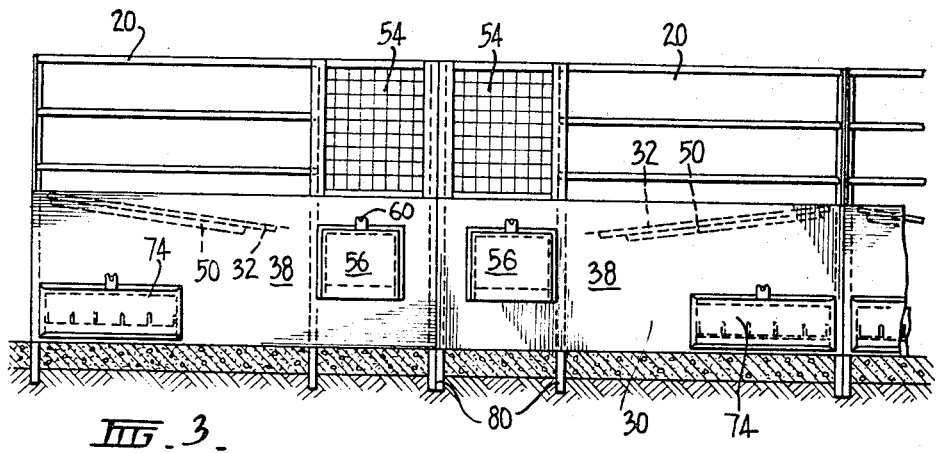
Inventor
Eva Larraine Smith
By Cushman, Darby & Cushman
Attorneys Dec. 31, 1968

E. L. SMITH 3,418,975

FARROWING PIG PEN

Filed Aug. 8, 1966

Inventor
Eva Lorraine Smith
By Cushman, Darby & Cushman
Attorneys

United States Patent Office 3,418,975
Patented Dec. 31, 1968

3,418,975
FARROWING PIG PEN
Eva L. Smith, Mayfair Flats, Bignold Ave.,
Bendigo, Victoria, Australia
Filed Aug. 8, 1966, Ser. No. 570,857
Claims priority, application Australia, Aug. 23, 1965,
63,070/65
12 Claims. (Cl. 119—20)

ABSTRACT OF THE DISCLOSURE

A square or rectangular pen for a farrowing sow including a pair of internal walls spaced from each other and extending from one corner of the pen to the opposite corner so as to define a sow crate between the internal walls, and a dunging area and creep area for piglets in the triangular areas, formed by the internal walls with the adjacent external walls.

---

This invention relates to an improved pig pen and more particularly to an improved pen having advantages over previously known pens for farrowing sows.

The development of more efficient production methods in industry in general has been accompanied by corresponding improvements in the methods used in primary industry. The improvement with which the present specification is concerned is the housing of farrowing sows.

In recent years there has developed the practice of placing sows under cover in individual pens in a shed shortly before they are due to farrow and keeping them there for their own protection and for the protection of the piglets after the piglets are born.

In one prior arrangement which has been used with some success, a pen measuring approximately 7'6" by 6' has been divided into three sections parallel to the longer sides. Of these sections the central section is a crate for the sow, while the two side sections provide a creep area and a dunging area respectively for the piglets. The walls or the like defining the sides of the sow crate each have a lower rail which is spaced above floor level a sufficient distance to allow the piglets to pass through. The creep area is artificially heated and hence the piglets are attracted into it very soon after they are born. The piglets quickly learn to distinguish the area in which they sleep and spend most of their time and, without any prompting, use the dunging area for its appointed purpose in order to keep the creep area clean.

The advantage of this system, besides the obvious ones of protecting the piglets from the weather and keeping each sow and her piglets separated from other pig families, is that the sow, while being given room to move to some extent and to lie down and stand up, is prevented from making any movements such as rolling which could result in the death by squashing of unwary piglets.

Since a farmer may have as many as two hundred, or in larger establishments even as many as one thousand or more sows to be accommodated, it will be appreciated that a pen which gives the same advantages as the above type but which occupies less space would be of considerable economic significance.

Accordingly, it is the primary object of this invention to provide a pen for farrowing sows which will require less space than those previously used.

It is a further object of the invention to provide such a pen which will have an adequate creep area and an adequate dunging area for the piglets and in which the creep area can be more economically heated than heretofore.

It is a further object of the invention to provide such a pen which will facilitate the servicing of food and drinking water supplies and in which the piglets in the creep area will be more readily accessible for inspection.

Yet another object of the invention is to provide a pen for farrowing sows which can be readily prefabricated. In the normal course of events such pens may be used in rows and the frefabricated sections may include parts of two adjacent pens.

With a view to achieving these objects the invention provides a pen for farrowing sows which is approximately square in plan view and which has a sow crate of suitable width extending between two opposite corners. The triangular sections on each side of the sow crate may be designated as a dunging area and a creep area respectively, for piglets and the creep area is preferably adapted to be heated.

Preferably the side walls of the sow crate are spaced from the floor of the pen by a sufficient distance to allow access to the creep and dunging areas for the piglets.

A gate may be provided at one end of the sow crate and containers for food and water at the other end of the crate.

Preferably there is provided a row of pens as above described, the arrangement being such that each sow crate is arranged at approximately 90° to the length of the sow crate in each adjacent pen.

The invention also provides a prefabricated set of co-operating members adapted to form a pen for a farrowing sow, said set comprising four external wall sections adapted to form a pen of approximately square shape in plan view, and two further wall sections each of which is of less length than a diagonal of the pen, said further wall sections being adapted to be attached to said external wall sections in such manner as to form a sow crate of suitable width extending between two opposite corners of said pen.

Further according to the invention there is provided a prefabricated set of co-operating members adapted to form a pair of pens for farrowing sows in side-by-side relationship, said set comprising six external wall sections adapted to form an enclosure of approximately rectangular shape in plan view, a dividing wall section adapted to divide said rectangular enclosure into two pens of approximately square shape in plan view, and two pairs of further wall sections each of which is of less length than a diagonal of the pen, said further wall sections being adapted to be attached to said external wall sections in such manner as to form a sow crate of suitable width extending between two opposite corners of each of said pens, said sow crates being arranged approximately at right angles to each other.

In order that the invention may be more readily understood it will now be described by way of reference to a particular embodiment illustrated in the accompanying drawings wherein:

FIGURE 1 is a somewhat diagrammatic plan view showing the arrangement of a number of pens according to the invention.

FIGURE 2 is a plan view to a larger scale illustrating in more detail a two-pen prefabricated unit.

FIGURE 3 is an elevational view on line 3—3 of FIGURE 2.

FIGURE 1 illustrates a number of pens, indicated generally as 10, 12, 14, 16 respectively, arranged in a row.

Figure 4:
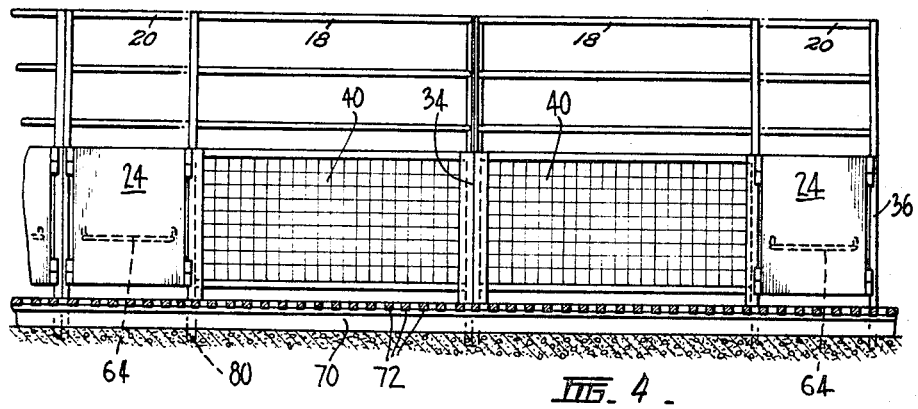
FIGURE 4 is an elevational view on line 4—4 of FIGURE 2.
Figure 5:
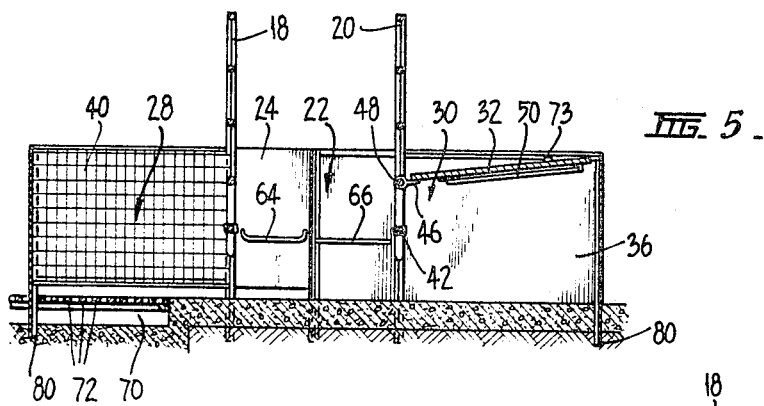
FIGURE 5 is a cross-sectional elevational view on line 5—5 of FIGURE 2.

Each pen is approximately five feet square and is provided with two dividing walls 18, 20 which between them define a sow crate 22 extending between two diagonally opposite corners of the pen, the walls 18, 20 being equally spaced on either side of the diagonal, and approximately two feet apart.

Each crate 22 has an access gate 24 leading from a common passageway 26, and the crates are arranged in such manner that each crate 22 extends approximately at right angles to the lengths of the crates in the two adjacent pens. The triangular area 28 of each pen adjacent passageway 26 is arranged as a dunging area for the piglets and the triangular area 30 of each pen remote from passageway 26 is covered by a lid 32 and artificially heated to provide a creep area for the piglets.

As can be seen more clearly from FIGURES 2 to 6 inclusive, the pens are prefabricated in groups of two, on a pipe framework. The external walls are approximately two feet high (this being sufficient to prevent escape of the piglets) and the walls 34, 36 between adjacent pens are covered with sheet metal screwed to the pipe frame to prevent contact between neighbouring families of piglets. The walls 38 remote from passageway 26 are also covered with sheet metal while the walls 40 adjacent passageway 26 are covered with wire mesh. The dividing walls 18, 20 are constructed from lengths of steel pipe welded together, and the lowest rail 42 of each wall is of a height to enable piglets to pass comfortably under it.

Figure 6:
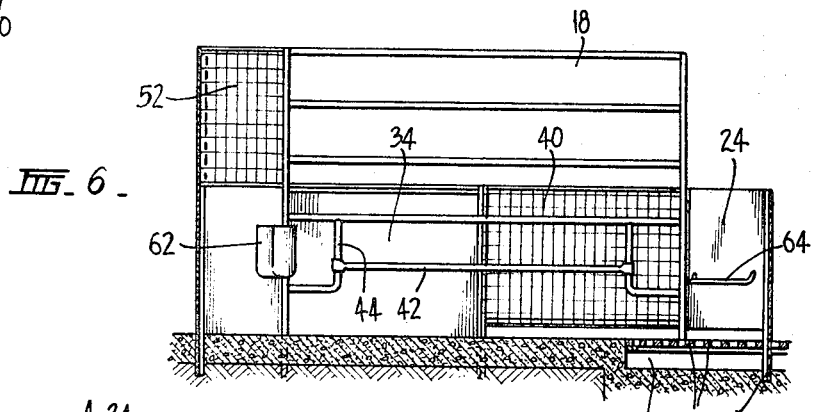
FIGURE 6 is a cross-sectional elevational view on 6—6 of FIGURE 2.
Figure 7:
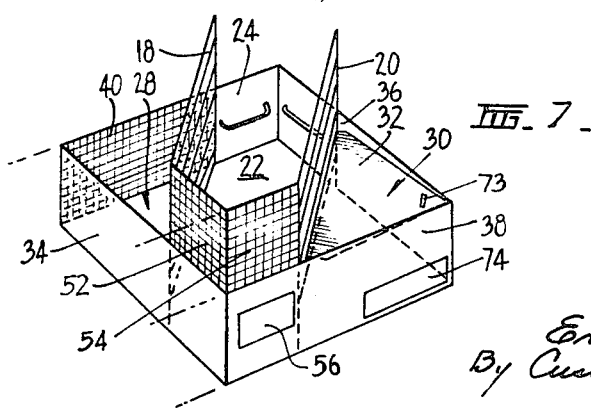
FIGURE 7 is a diagrammatic perspective view of a pen according to the invention.

As illustrated in FIGURE 6, rail 42 is slidably mounted on two vertical members 44 and provided with clamping means (not shown) to enable it to be located at a convenient height having regard to the size of the sow.

The heating means for the creep areas 30 is preferably a low temperature electrically heated radiator (not shown) and the covered walls and lid 32 assist in retaining the heat from the radiator in the creep area. Lid 32 is supported on two pins or pegs 46, extending from rail 48 of dividing wall 20 (see FIGURES 2 and 5) and on two lid stops 50 fixed to walls 36 and 38 (see FIGURES 2, 3 and 5).

A sow can be driven into each crate through gate 24 and will be held in the crate with its tail adjacent the gate. Each side wall 18, 20 is approximately four feet high and the head end of each crate above the external walls 34 and 38 is enclosed to a height of approximately four feet by wire mesh 52, 54. The head end of each crate is provided with a feed trough 56 pivoted about its lower edge in wall 38 so that it may be tilted out into passageway 58 for filling. In its normal position shown in FIGURE 2 each feed trough is held against tilting by a latch 60. A water trough 62 common to two adjacent crates is supported in dividing wall 34. Rails 64, 66 on door 24 and on wall 36 adjacent door 24 keep the rear end of the sow spaced from the door. A pit 70 (see FIGURES 4, 5 and 6) is formed in the concrete floor beneath the dunging areas and is covered by slats 72.

It will be observed that the creep area 30 of each pen is adjacent the creep area of the adjacent pen. This arrangement makes heating more economical and a common heating means may be provided, for each pair of creep areas, in the wall dividing them. The lids 32 of the two creep areas pivot about their lower edges adjacent the respective sow crates and are provided with handles 73 so that a person standing at the junction of the two pens may, without moving, lift the lid of first one creep area and then the other creep area, to inspect the piglets.

There is a feeding and watering point at every ten feet along passageway 58 and all of the access gates are along passageway 26.

It is the usual practice to have some form of small trough from which the piglets may learn to feed after they have reached the age of about one week. Either of the two walls of the creep area may be used for the attachment of such a trough, although in the present example the troughs 74 are shown pivoted in wall 38 in similar manner to troughs 56. Alternatively the trough 74 may be in the form of a drawer which can be inserted from outside the pens into the common wall of two adjacent creep areas so as to be accessible to the piglets on each side. In either case servicing of the trough is simple since it merely has to be pulled out to be cleaned or replenished.

A second row of pens may be provided on the other side of passageway 26, these additional pens preferably being oriented in such manner that their access gates open on to passageway 26 Similarly a third row of pens may be provided on the other side of passageway 58 oriented so that their feed troughs are accessible from passageway 58. This facilitates servicing and reduces the time required to replenish the feed troughs of two rows of pens.

A sow in the crates described is able to stand up and can move slightly backwards and forwards and to either side but cannot turn around. She may lie down on either side with her feet extending into the creep area or the dunging area, but is prevented from rolling over. The piglets have access to the sow's dugs or teats when she is lying on her side. The room available is such that in the usual case their bodies are located in either the creep area or the dunging area during feeding with their heads protruding through under the bottom rail 42 of the side walls of the crate into the crate itself. Raising of the bottom rail facilitates this access in the case of particularly fat sows.

In the previously known type of pen described above the dimensions are approximately 7'6" by 6'0" giving a total area of forty-five square feet. The area of the present pen which is approximately 5' by 5' is twenty-five square feet. Thus there is a saving in area of 44.4%. Access passageways of approximately the same width will have to be provided for either type of pen but nevertheless the pen of the present invention permits a reduction of at least 25% in the floor area of a shed required to house a given number of pens as compared with the floor area of a shed required to house the same number of pens of the previously known type.

To facilitate the erection of the pens and to reduce their cost by enabling them to be produced as far as possible in a factory, they are formed in several prefabricated sections. Two adjacent pens may, for example, be erected using two prefabricated wall sections 40, two prefabricated wall sections 38, one prefabricated wall section 34, two prefabricated wall sections 36, two prefabricated dividing walls 18, two prefabricated dividing walls 20, two gates 24, two creep area lids 32, two feed troughs 56, a water trough 62 and two feed troughs 74.

A further pair of pens may be erected adjacent the first pair using a similar group of parts but if so desired omitting one wall 36. The various walls are provided with matching brackets having drilled holes to enable them to be bolted together or may be arranged to be welded together.

The legs of the prefabricated wall sections are provided with extensions 80 to enable them to be cast into a concrete floor. Where the pens are to be erected in a new building it is preferred to cast the whole of the floor before the pens are erected, cored holes being left for the legs 80. After the floor is completed the pens can be erected with the legs extending down into the holes, and concrete can be poured into the holes around the legs to hold the latter firmly in position. Alternatively each leg can be provided with a foot for attachment to the concrete floor, a suitable means for attachment being powder operated power tools which use a cartridge to drive a fastener through the feet and into the concrete.

Thus there is provided a pen for farrowing sows which will require less space than those previously used, while at the same time having an adequate creep area and an adequate dunging area for the piglets. The pen of the invention also facilitates the servicing of food and drinking water supplies and enables more convenient inspection of the piglets in the creep area.

I claim:
1. A pen for a farrowing sow comprising:
   four external walls arranged generally at right angles to each other and defining a pen; and
   a pair of internal walls spaced apart from each other and extending generally between opposite corners of said pen, said internal walls dividing said pen into a sow crate between said internal walls, a triangular dunging area for piglets exteriorly of one of said internal walls and a triangular creep area for piglets exteriorly of said other internal wall.

2. A pen as claimed in claim 1 wherein said internal walls are spaced from the floor to allow piglets to pass under said internal walls.

3. A pen as claimed in claim 2 wherein the bottom edges of said internal walls are defined by rails and including means for adjusting the height of said rails above the floor.

4. A pen as claimed in claim 1 wherein said external walls are approximately of equal length so as to define a pen of square shape.

5. A pen as claimed in claim 1 additionally including an adjacent second pen of construction similar to the construction of the first pen, the longitudinal axis of the sow crate of said second pen being arranged at an approximately 90° angle with respect to the longitudinal axis of the sow crate of said first pen.

6. A pen as claimed in claim 1 additionally including a plurality of adjacent pens of construction similar to the construction of the first pen, the longitudinal axis of the sow crate of each pen being arranged at an approximately 90° angle with respect to the longitudinal axis of the sow crate of the adjacent pen.

7. A pen as claimed in claim 1 wherein the creep area is provided with heating means.

8. A pen as claimed in claim 1 wherein the creep area is covered by a lid and provided with heating means.

9. A pen as claimed in claim 1 wherein the sow crate is provided with a door at one end and a feed trough at the other end.

10. A pen as claimed in claim 9 wherein said other end of the sow crate is also provided with a water trough.

11. A pen according to claim 1 wherein said creep area is provided with a feed trough for piglets.

12. A pen according to claim 1 wherein said internal walls defining the sow crate are parallel to and equally spaced each side of a diagonal of the pen.

References Cited

UNITED STATES PATENTS

| | | | |
|---|---|---|---|
| 2,740,379 | 4/1956 | Collins | 119—20 |
| 2,940,423 | 6/1960 | Frye | 119—20 |
| 3,011,475 | 12/1961 | Golay | 119—20 |
| 3,028,097 | 4/1962 | Johnson | 119—20 X |
| 3,105,462 | 10/1963 | Miller | 119—20 |
| 3,237,600 | 3/1966 | Behrens | 119—20 |
| 3,283,744 | 11/1966 | Conover | 119—16 |

ALDRICH F. MEDBERY, *Primary Examiner.*

U.S. Cl. X.R.

119—28